United States Patent [19]

Bi

[11] Patent Number: 5,353,302
[45] Date of Patent: Oct. 4, 1994

[54] SIGNAL DESPREADER FOR CDMA SYSTEMS

[75] Inventor: Qi Bi, Morris Plains, N.J.

[73] Assignee: AT&T Bell Laboratories, Murray Hill, N.J.

[21] Appl. No.: 12,870

[22] Filed: Feb. 3, 1993

[51] Int. Cl.$^5$ ............................................. H04L 27/30
[52] U.S. Cl. .............................................. 375/1; 380/34; 370/18
[58] Field of Search .................. 375/1; 380/34; 378/18

[56] References Cited

U.S. PATENT DOCUMENTS

| | | | |
|---|---|---|---|
| 3,720,789 | 3/1973 | Clark | 370/18 |
| 4,361,891 | 11/1982 | Lobenstein et al. | 375/1 |
| 4,363,338 | 12/1982 | McRae et al. | 375/1 X |
| 4,611,333 | 9/1986 | McCallister et al. | 375/1 |
| 4,885,757 | 12/1989 | Provence | 375/1 X |
| 5,136,612 | 8/1992 | Bi | 375/1 |
| 5,170,410 | 12/1992 | Gressier et al. | 375/1 |
| 5,173,923 | 12/1992 | Crespo et al. | 375/1 |
| 5,175,743 | 12/1992 | Crespo et al. | 375/1 |
| 5,175,744 | 12/1992 | Crespo et al. | 375/1 |
| 5,177,768 | 1/1993 | Crespo et al. | 375/1 |
| 5,181,225 | 1/1993 | Neeser et al. | 375/1 |

OTHER PUBLICATIONS

R. Lupas and S. Verdu, "Near-Far Resistance of Multi-user Detectors in Asynchronous Channels", *IEEE Transactions on Communications*, vol. 38, No. 4, Apr. 1990, pp. 496–507.

Q. Bi, "Performance Analysis of a CDMA Cellular System in the Multipath Fading Environment", *The Third IEEE International Symposium on Personal, Indoor and Mobile Radio Communications*, Oct. 19–21, 1992, pp. 4.3.1–4.3.4.

Primary Examiner—Bernarr E. Gregory
Attorney, Agent, or Firm—David R. Padnes

[57] ABSTRACT

A signal despreader for use in a CDMA system processes samples of the received signal with filtered replicas of the code coefficient sequences associated with the system users. The symbols transmitted by each system user are recovered using a filtered replica of that user's associated code coefficient sequence. In the disclosed embodiment, the communications channel between each system user's transmitter and the base station is bandlimited. Accordingly, within each user's transmitter, filtering apparatus having a frequency characteristic is utilized to limit the frequency spectrum of each coded signal to a predetermined bandwidth equal to or less than that of the communications channel. Each filtered replica, pursuant to the present invention, reflects this frequency characteristic. In addition, the communications channel also has a frequency characteristic, and each filtered replica can reflect this characteristic as well.

9 Claims, 3 Drawing Sheets

SIGNAL DESPREADER FOR CDMA SYSTEMS

Technical Field

The present invention pertains to recovering transmitted data in the receiver of a Code Division Multiple Access (CDMA) system and, more particularly, to apparatus for use in such systems which despreads a received CDMA signal.

BACKGROUND OF THE INVENTION

CDMA is a signal modulation technique used in a variety of applications, such as cellular and wireless communications systems. In such systems, multiple users communicate at will over a common frequency band with a base station. Each of these users transmits a uniquely ceded signal. Therefore, the received signal at the base station is a composite of many differently coded signals. Each coded signal is formed by multiplying each of a succession of digital symbols by more than one code coefficient. The product of each symbol times one code coefficient is a "chip" and each chip extends over a portion of the bit interval known as a chip interval. At the receiver, each user's encoded digital symbols are recovered from the incoming composite signal using code coefficients which replicate those used by each user.

It has long been recognized that during transmission a substantial amount of interference can be introduced into each coded signal from the other coded signals and compensation for this interference must be provided for intelligible communications. To reduce this interference, a number of different interference reduction techniques have been devised. In one prior art technique, apparatus is used in the receiver which operates on each user's symbols outputted by a despreader using priorly recovered other users' symbols. See, for example, U.S. Pat. No. 5,136,612, issued Aug. 4, 1992 and entitled "Method and Apparatus for Reducing Effects of Multiple Access Interference in a Radio Receiver in a Code Division Multiple Access Communication System." Another class of prior art systems uses an approach which operates on the received composite signal over a time interval using blocks of code coefficients wherein each block includes the code coefficients of each user corresponding to this time interval. See, for example, a publication entitled "Near-Far Resistance of Multiuser Detectors in Asynchronous Channels," *I.E.E.E. Transactions on Communication*, Vol. 38, No. 4, April 1990, and, more recently, a pending patent application entitled Data Recovery Technique for Asynchronous CDMA Systems, Ser. No. 07/982168, filed on Nov. 24, 1992, and assigned to the present assignee. Yet another class of prior an systems reduces interference by despreading the received signal using code coefficient sequences which are different from those utilized by the users to generate their respective coded signals. See, for example, pending U.S. application Ser. No. 07/991841, entitled "Despreading Technique for CDMA Systems," filed Dec. 16, 1992, and assigned to the present assignee. While all of these prior art arrangements substantially improve the performance of standard CDMA systems, there are applications where it is desirable to provide still higher performance levels without incurring any substantial additional costs.

It would, therefore, be desirable if a low-cost, data recovery technique could be developed for CDMA systems which provides a level of interference lower than that obtainable with prior art arrangements.

SUMMARY OF THE INVENTION

In accordance with the present invention, signal despreading in a CDMA system is provided by processing the received signal with a filtered replica of the code coefficient sequence utilized by each system user. In the disclosed embodiment, the communications channel between each system user's transmitter and the base station is bandlimited and has an associated frequency characteristic. Within each user's transmitter, filtering apparatus having an associated frequency characteristic is utilized to limit the frequency spectrum of each coded signal to a predetermined bandwidth equal to or less than that of the communications channel. Each filtered replica, pursuant to the present invention, reflects the frequency characteristic associated with the transmitter filtering apparatus and/or the communications channel. In the disclosed embodiment, the filtering reflected in each filtered replica is a combination of the filter and communications channel frequency characteristics. Advantageously, the present invention can be utilized alone or combined with prior art interference reduction techniques to improve CDMA system performance.

DETAILED DESCRIPTION

In the illustrative system incorporating the present invention, bits representative of voice and/or data information are communicated between each of a plurality of system users and a central base station. The communication from the different system users and the base station is asynchronous, each user's transmission arriving at an arbitrary time relative to another user's transmission. In addition, such communications utilize Quadrature Phase Shift Keying (QPSK) modulation, it being understood, of course, that the present invention is not limited to such modulation but can be utilized with systems employing Binary Phase Shift Keying (BPSK) or a variety of other modulation schemes.

Figure 1:
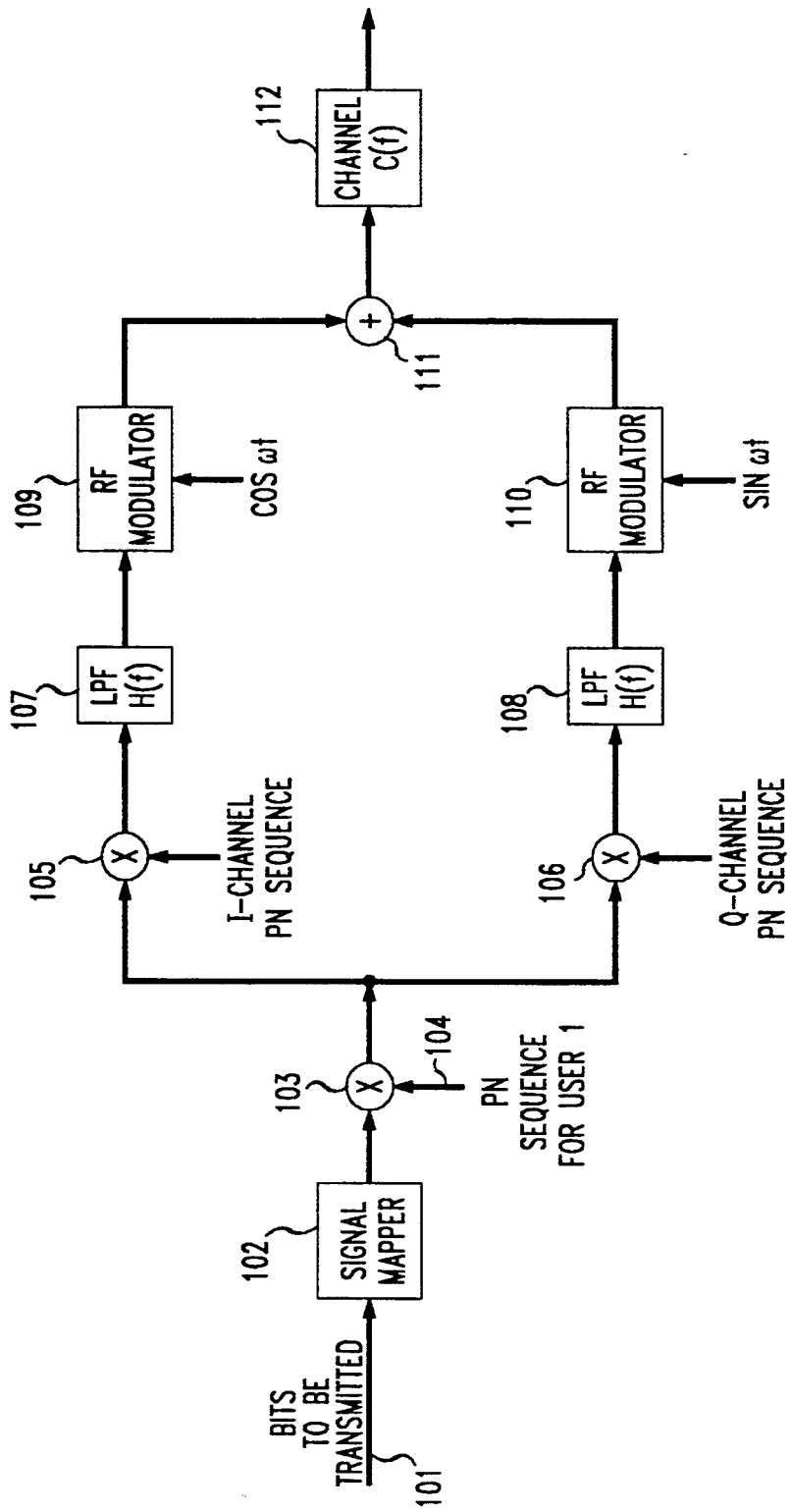
FIG. 1 is a block-schematic diagram of a conventional transmitter for an illustrative CDMA system which incorporates the present invention.

Referring to FIG. 1, the conventional transmitter structure 100 for one of the plurality of system users, designated as user 1, is shown. Each of the other users has an identical transmitter structure to transmit that user's associated information signal to the base station. Lead 101 couples the bits representative of the information signal of user 1 to signal mapper 102. The mapper converts K successive bits on lead 101 into one of M associated symbols in accordance with a predetermined mapping function. The numbers K and M are preselected integers governed by the relationship $M=2^K$, and mapper 102 is often referred to as an "M-ary" symbol mapper. Each of the symbols thus provided is multiplied via multiplier 103 by a pseudorandom (PN) sequence for user 1. This sequence is coupled to multiplier 103 by lead 104. The number of signal values in the sequence is m and such multiplication provides m "chips" per symbol, where m is a predetermined integer. This multiplication, as is known, spreads the frequency spectrum of each symbol. Each of the chips provided by multiplier 103 is coupled to multipliers 105 and multiplier 106 which respectively multiply each chip by an I channel PN sequence and a Q channel PN sequence. The I and Q channel PN sequences are different from one another and are provided by conventional PN sequence generators (not shown). At this juncture, it should be apparent that the chips provided by multipliers 105 and 106 represent the same information signal and, therefore, this arrangement of a QPSK modulation scheme provides signal redundancy and diversity protection. In addition, while the user of multiplier 103 in combination with multipliers 105 and 106 is preferable as such joint multiplication further spreads each symbol in the frequency domain, the use of multiplier 103 may be omitted.

Low-pass filters (LPF) 107 and 108, possessing a transfer function designated as H(f), respectively filter the outputs of multipliers 105 and 106 so as to limit the spectrum of the chips for communication through a bandlimited channel. The stream of bandlimited chips at the outputs of these filters is then modulated by cos $\omega t$ and sin $\omega t$ via radio frequency (RF) modulators 109 and 110. Summer 111 then adds these signals and couples the sum to channel 112 having a transfer function designated as C(f).

Figure 2:
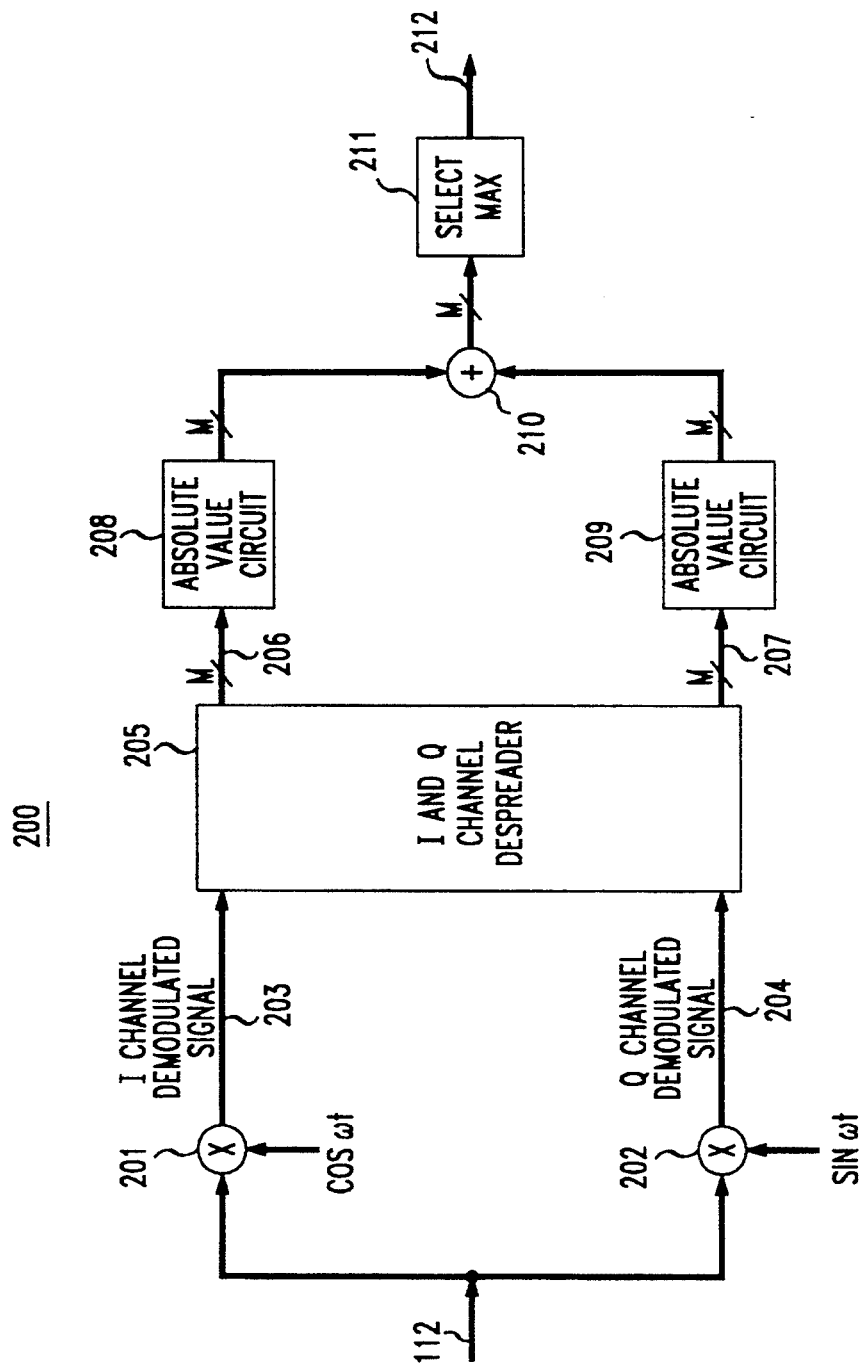
FIG. 2 is a block-schematic diagram of a receiver which incorporates the present invention in the illustrative CDMA system.

Refer now to FIG. 2 which shows the receiver in the base station for user 1. The receiver for each of the other users is identical to that shown in FIG. 2. The signal from channel 112 is coupled to receiver 200 for user 1 wherein multipliers 201 and 202 respectively provide the I and Q channel demodulated signal on leads 203 and 204 by multiplying the received signal by cos $\omega t$ and sin $\omega t$. I and Q channel despreader 205 provides M estimates of each user's transmitted symbols in the I channel and M estimates of each user's symbols in the Q channel. The M estimates of the I channel can be designated as $E_i^I$ and the M estimates of the Q channel can be designated as $E_i^Q$, where i is an index and $1 \leq i \leq M$. $E_i^I$ and $E_i^Q$ are respectively coupled via buses 206 and 207 to absolute value circuits 208 and 209. Each of the leads of these buses conveys a different estimate and corresponding leads on these buses couple an estimate bearing the same index. Each estimate provided by despreader 205 includes amplitude and phase information. The latter information is ignored by each of the absolute value circuits since these circuits output the absolute value of each of their M received symbol estimates. Summer 210 adds each of the M absolute values provided by circuits 208 to the corresponding one of the M absolute values provided by circuit 209 and couples these sums, designated as S i to selector 211. Selector 211 selects the maximum sum provided by summer 210 and maps the selected maximum into its corresponding one of the M symbols. This corresponding symbol is coupled to lead 212.

Figure 3:
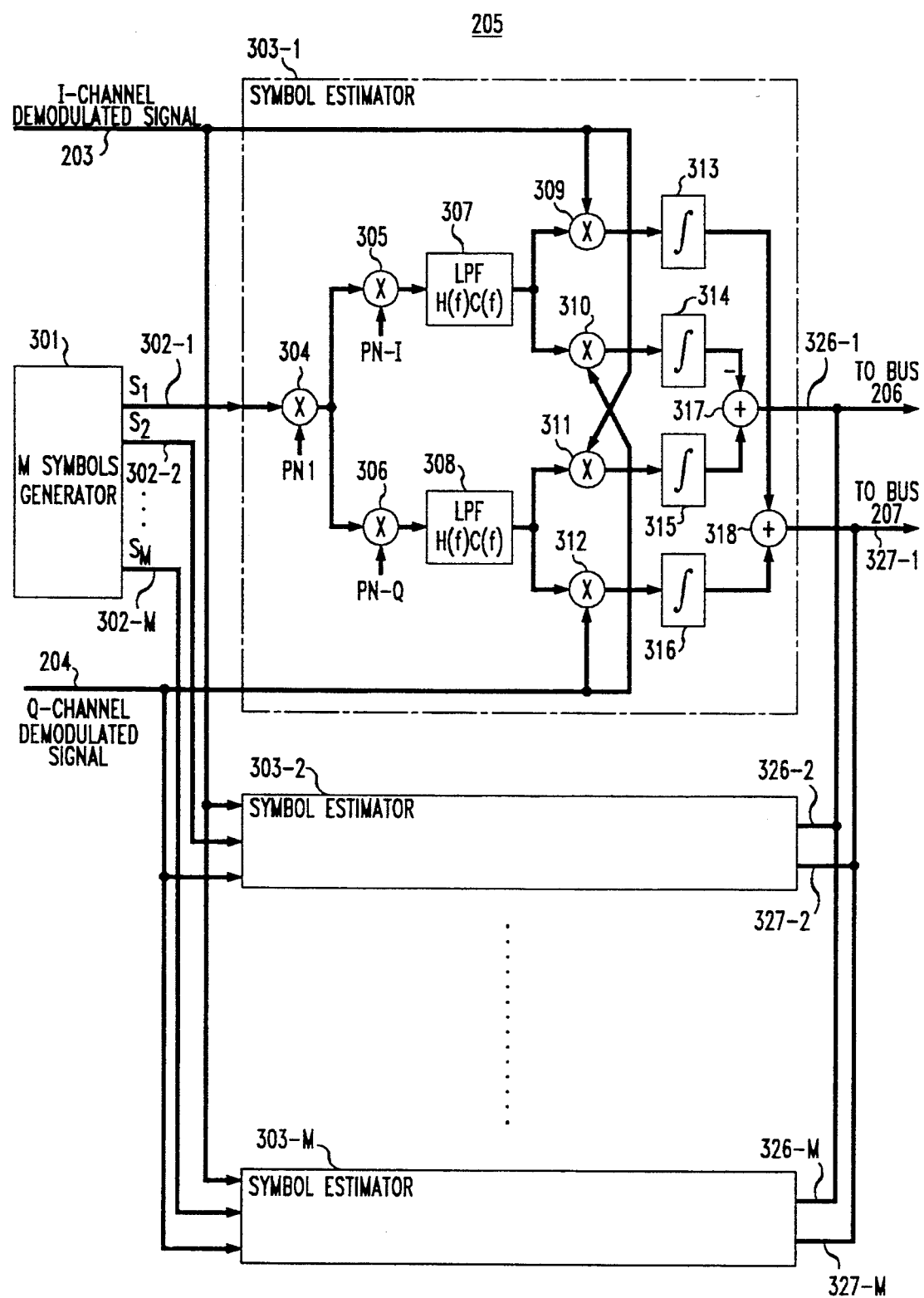
FIG. 3 is a detailed schematic diagram of the signal despreader in FIG. 2.

Referring to FIG. 3, despreader 205, unlike prior art despreaders, incorporates filters which provide a transfer function which matches that provided by channel 112 and filters 107 and 108 in the transmitter. Despreader 205 includes M symbol generator 301 which provides each of the M possible symbols outputted by mapper 102 in FIG. 1. These M symbols, designated in FIG. 3 as $S_1, S_2, \ldots S_M$, are respectively provided via leads 302-1, 302-2 . . . 302-M to symbol estimators 303-1, 303-2 . . . 303-M. Each of these symbol estimators is identical to one another and FIG. 3 shows the circuitry within estimator 303-1.

As shown, the symbol $S_1$ is multiplied by the PN sequence for user 1 by multiplier 304. The product provided by multiplier 304 is then multiplied by the I and Q channel PN sequences via multipliers 305 and 306 and thence coupled to filters 307 and 308. Each of these filters has a transfer function H(f)C(f) and therefore each filter provides the frequency shaping provided to a symbol coupled through the transmitter and communications channel.

At this juncture, it should be noted that because the cos and sin functions provided to multipliers 201 and 202 in FIG. 2 are not phase locked to those utilized in the transmitter of FIG. 1, there is a cross-coupling of I and Q transmitter channel symbols and, as a result, the I channel demodulated signal includes the I transmitter channel symbol and a portion of the Q transmitter channel symbol. Similarly, the Q channel demodulated signal includes the Q transmitter channel symbol and a portion of the I transmitter channel symbol. Multiplier 309 multiplies the output of filter 307 by the I channel demodulated signal to form an estimate of the I transmitter channel symbol in the I demodulated signal and multiplier 310 multiplies the output of filter 307 by the Q channel demodulated signal to form an estimate of the I channel symbol in the Q channel demodulated signal. Similarly, multiplier 311 multiplies the output of filter 308 by the I channel demodulated signal to form an estimate of the portion of the Q transmitter channel symbol in the I demodulated signal and multiplier 312 multiplies the output of filter 310 by the Q channel demodulated signal to form an estimate of the Q transmitter channel symbol in the Q demodulated signal. Each of these four estimates is then respectively integrated over each symbol interval via integrators 313 through 316.

It can be shown that the estimates provided by multipliers 309 and 312 are in phase and, due to the redundant nature of the I and Q symbols in the disclosed embodiment, it is preferable to sum the outputs of multipliers 309 and 312 via summer 318. In similar fashion, the outputs of multipliers 310 and 311 are in phase and it is preferable to form the algebraic difference of these estimates via summer 317. Leads 326-1 and 327-1 couple the outputs of summers 317 and 318 to a lead of buses 206 and 207. Bus 206 also couples the outputs of summer 317 in each of the other symbol estimators 303-2 through 303-M via leads 326-2 through 326-M. In similar fashion, the outputs of summer 318 in symbol estimators 303-2 through 303-M are provided to bus 207 by leads 327-2 through 327-M.

It should, of course, be noted that while the present invention has been described in terms of an illustrative embodiment, other arrangements will be apparent to those of ordinary skill in the art. For example, while the present invention has been described in reference to a QPSK modulation arrangement, the invention is also applicable to a baseband modulation format wherein signal redundancy is not required. In such applications, the signal mapper 102; multipliers 103, 106; filter 108; modulator 110; and summer 111 are not necessary. In the base station, the despreader would process samples of the received signal using a filtered replica of each user's sequence of code coefficients. The filtering in each such replica would reflect the filtering provided in each user's transmitter alone or in combination with the frequency characteristic of the communications channel between each user and the base station. Finally, in any application of the present invention, the frequency characteristic of the communications channel C(f) may have a constant value or any particular shape over the frequency band through which information is communicated.

I claim:

1. In a CDMA system which transmits a coded signal for each of a plurality of users through a bandlimited channel, each coded user signal being formed by processing that user's symbols using a sequence of code coefficients, said sequence being different for each user, and wherein a received signal includes a composite of all coded user signals, apparatus comprising:
   means for receiving samples of said received signal;
   means for forming a filtered replica of each sequence of code coefficients: and
   means for estimating a user's symbols in response to said received signal samples and in response to said filtered replica of the sequence of code coefficients used to from this user's coded signal.

2. The apparatus of claim 1 wherein the processing to form each coded user signal utilizes means which provides a first transfer function and said estimating means also provides said first transfer function.

3. The apparatus of claim 1 wherein said bandlimiting channel provides a second transfer function and said estimating means also provides said second transfer function.

4. The apparatus of claim 3 wherein said estimating means provides a third transfer function equal to a product of said first transfer function and said second transfer function.

5. The apparatus of claim 1 wherein said bandlimiting channel provides a second transfer function and said estimating means also provides said second transfer function.

6. The apparatus of claim 1 wherein said sequence of code coefficients is a pseudorandom sequence and the processing to form a coded user signal from that user's symbols includes means for providing said pseudorandom sequence.

7. The apparatus of claim 1 wherein each coded signal has a finite set of signal values and said estimating means includes means for generating said finite set of signal values and means for processing said finite set of signal values, said processing means being responsive to said received signal samples and said filtered replica.

8. The apparatus of claim 7 wherein said processing means provides a processed finite set of signal values and said estimating means further includes means for selecting one signal value from said processed finite set of signal values.

9. In a CDMA system which transmits a coded signal for each of a plurality of users through a bandlimited channel, each coded user signal being formed by processing that user's symbols using a sequence of code coefficients which is different for each user and wherein a received signal includes a composite of all coded user signals, a method comprising the steps of:
   receiving samples of said received signal;
   forming a filtered replica of each sequence of code coefficients: and
   estimating a user's symbols in response to said received signal samples and in response to said filtered replica of the sequence of code coefficients used to form this user's coded signal.

* * * * *